Jan. 19, 1960   J. A. MALACHICK   2,921,720
VISUAL CEREAL DISPENSER
Filed May 7, 1958   2 Sheets-Sheet 2
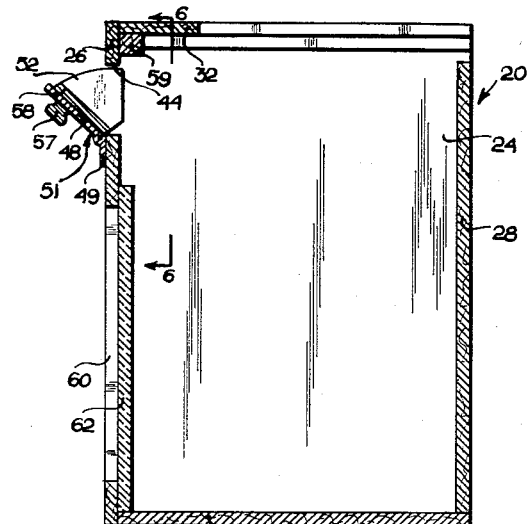
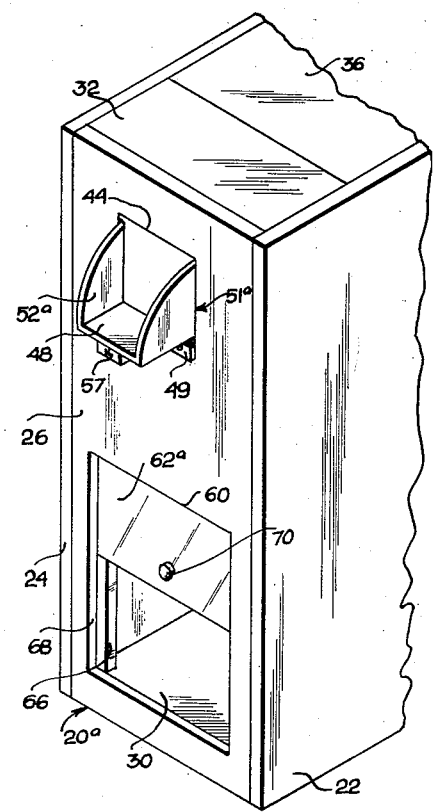
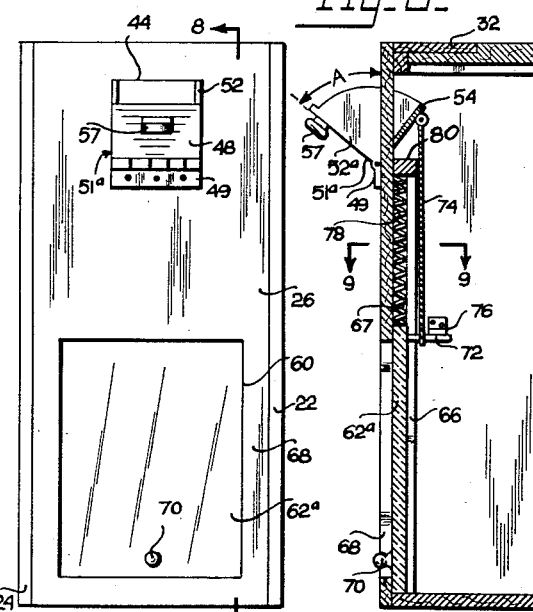
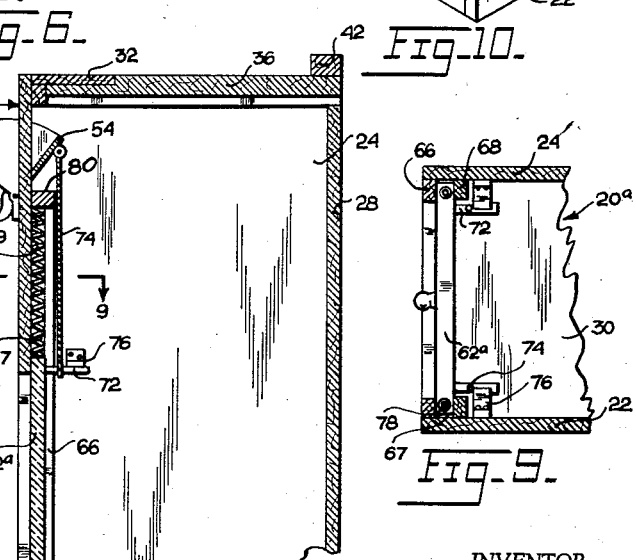
INVENTOR.
JOSEPH A. MALACHICK
BY
ATTORNEY

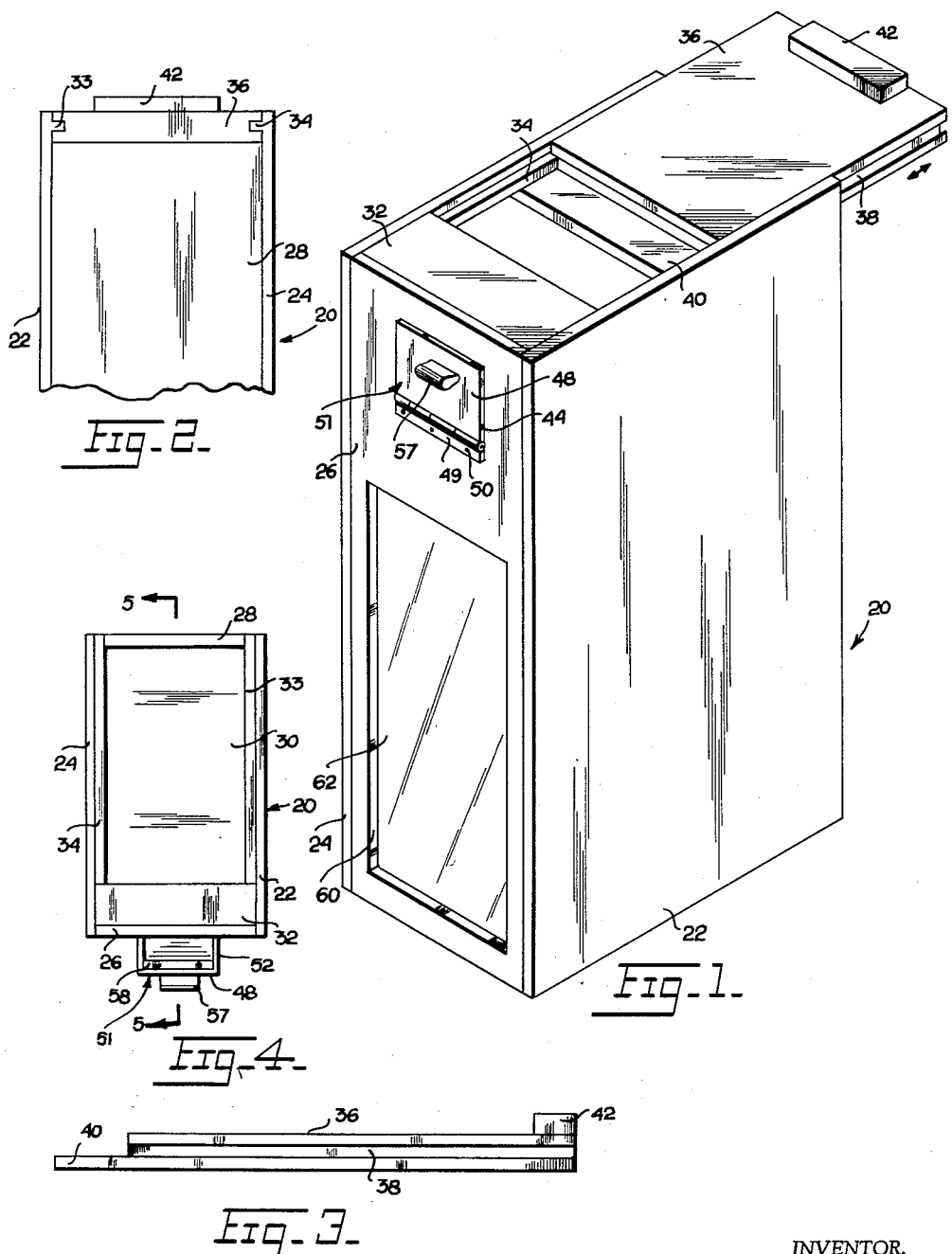

United States Patent Office 2,921,720
Patented Jan. 19, 1960

2,921,720

VISUAL CEREAL DISPENSER

Joseph A. Malachick, New York, N.Y.

Application May 7, 1958, Serial No. 733,603

2 Claims. (Cl. 222—154)

This invention concerns a storage and dispensing container for cereals, detergents, and other granulated materials.

According to the invention there is provided a hollow casing with a slidable top panel through which the container may be filled. One end wall of the container is provided with a retractable spout for dispensing the contents of the container. A transparent window is provided in the end wall. In another form of the invention the retractable spout is arranged for opening the window so that the contents of the container can be discharged at a faster rate.

It is, therefore, a principal object of the invention to provide a hollow casing for holding, storing and dispensing granular material.

It is a further object to provide a hollow casing with a retractable spout and transparent window in one wall thereof.

It is a further object to provide a container including a hollow casing having a retractable spout in one wall and a window slidably mounted at the wall, the window being openable under spring tension when the spout is extended to actuate a latch provided in the container.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a container embodying the invention.

Fig. 2 is a rear end elevational view of a portion of the container.

Fig. 3 is a side view of a cover plate employed in the container.

Fig. 4 is a top plan view of the container with cover plate removed.

Fig. 5 is a sectional view taken on lines 5—5 of Fig. 4.

Fig. 6 is a sectional view taken on lines 6—6 of Fig. 5.

Fig. 7 is a front elevational view of a container embodying another form of the invention.

Fig. 8 is a sectional view taken on lines 8—8 of Fig. 7.

Fig. 9 is a sectional view taken on lines 9—9 of Fig. 8.

Fig. 10 is a perspective view of a portion of the container of Figs. 7–9.

The container shown in Figs. 1–6, includes a hollow rectangular casing generally designated 20. The casing has side panels or walls 22, 24, a front panel or wall 26, a rear wall 28, a bottom plate 30, and a short top plate 32. Near the open top of the casing are rails 33 and 34 mounted on walls 22 and 24, respectively. A cover plate 36 is provided for closing the opening in the top of the casing. This plate has lateral grooves 38 which engage slidably the rails 33 and 34. Plate 36 has a lower forwardly extending projection 40 adapted to extend under the short top plate 32 when the cover plate is closed. On top of the plate 36 at its outer end is a handle bar 42 for sliding the cover open and closed on the casing.

In the front wall 26 is provided an upper rectangular opening 44. In this opening is mounted a metal spout 51. The spout has a front rectangular wall or panel plate 48 which is mounted by hinge 49 and nails or screws 50 to the front panel 26. At the ends of wall 48 the spout is folded to form two side panels 52. The sides are folded outwardly at their ends to form two wings 54, 56. These wings serve as stop elements to prevent or limit outward movement of the spout to the angular position shown in Figs. 4 and 5. The wall 48 may be lined on its inner side with a plate 58 to provide a substantially smooth continuous pouring surface with the inner side of wall 26. A crossbar 59 serves to reinforce the joint between top plate 32 and the front wall 26. The spout has a handle 57 on wall 48.

Another rectangular lower opening 60 is provided in the lower part of wall 26. At this opening is secured by cement or other suitable means a transparent rectangular glass or plastic plate 62. This plate serves as a window so that a view is provided of the nature and quantity of the contents of the casing at all times. The cover 36 provides a means for filling the casing with desired granular material and the spout provides a controllable outlet for dispensing material therefrom.

In the form of the invention shown in Figs. 7–10, plate or window 62ª is slidably mounted at the front wall 26 between rails 66 and 68. The rails 68 are narrow portions of wall 26 defined between and on opposite sides of opening 60. A knob handle 70 is mounted on the lower end of the plate 62ª. Extending from plate 62ª near the top thereof are two pins 72. Attached to these pins are strings or cords 74. The cords are secured to the wings 54 and 56 on the rear ends of side walls 52ª of the spout 51ª. Walls 52ª are substantially quadrants of circles. Two short leaf springs 76 are secured on walls 22 and 24 and extend outwardly a sufficient distance to engage the pins 72. When the plate 62ª is closed these leaf springs contact the pins and hold the plate closed against tension in extending coil springs 78. The coil springs are attached between the top edge of plate 62ª and a crossbar 80 which extends across the rear of wall 26 at the top ends of rails 68. The springs are disposed in the grooves 67 defined between rails 66 and 68. Plate 62ª may be a transparent plastic plate as indicated in Fig. 8.

In operation of the mechanism shown in Figs. 8 and 9, the spout can be normally opened an angle A of about 60° for convenient pouring out of the contents through the small opening 44. At this position of the spout the cords 74 will be taut and will limit further opening of the spout. The spout may be opened further so that wall 48 assumes a position of substantially 90° to wall 26 as shown in Fig. 10. To open the spout to this extent the pins 72 will be forced upwardly past the springs 76, whereupon the plate 62ª will be released and the extended tensioned springs 78 will retract the plate 62ª to the position shown in Fig. 10. This provides a larger opening for discharging the contents of the casing 20ª at a faster rate than is possible through smaller opening 44. Opening the spout 51ª to its fullest extent serves to trip the latch mechanism which releases the plate 62ª. To close the plate or window, it will be manually pulled down by means of knob handle 70 until the pins 72 snap downwardly past the springs 76.

There is thus provided an automatically opening window controlled by a manually extendable spout. Of course, window 62ª when in closed position provides a view of the quantity and nature of the contents of the casing in the same manner as the form of the invention of Figs. 1–6.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A container for granular materials or the like, comprising a generally rectangular hollow casing, said casing having side, front, rear, top and bottom walls, said front wall having smaller and larger rectangular openings therein, a spout pivotally mounted in the smaller of said openings and a window mounted in the larger of said openings, said spout being formed with a metal body including a front panel, side panels bent rearwardly from the front panel, and laterally extending wings bent outwardly from the inner ends of the side panels to limit outward pivoting of the spout, a pair of rails mounted vertically at the side walls of the casing near and spaced from the front wall thereof, said window being slidably disposed in grooves defined between said rails and said front wall, spring means disposed in said grooves and tending to open said window, latch means holding said window closed, means operatively connecting said spout to said window, said connecting means comprising at least one pin mounted on and extending from the window near the top and at one side thereof; at least one string connected at one of its ends to said pin and at the other of its ends to the one of said wings on the spout at the same side as the string, the string being of such length that the spout can be opened a predetermined angular position without actuating said latch means; and at least one leaf spring mounted on the side wall adjacent said connecting means, said latch means consisting of said one pin and said leaf spring; said first-mentioned spring means being a coil spring connected between the top of said window and the top of the groove at the side adjacent thereto.

2. A container for granular materials or the like, comprising a generally rectangular hollow casing, said casing having side, front, rear, top and bottom walls, said front wall having smaller and larger rectangular openings therein, a spout pivotally mounted in the smaller of said openings and a window mounted in the larger of said openings, said spout being formed with a metal body including a front panel, side panels bent rearwardly from the front panel, and laterally extending wings bent outwardly from the inner ends of the side panels to limit outward pivoting of the spout, a pair of rails mounted vertically at the side walls of the casing near and spaced from the front wall thereof, said window being slidably disposed in grooves defined between said rails and said front wall, spring means disposed in said grooves and tending to open said window, latch means holding said window closed, means operatively connecting said spout to said window, said connecting means comprising a pair of pins mounted on and extending from the window near the top and at the sides thereof; a pair of strings connected at one end to said pins and at the other end to the wings on the spout at the same sides as the strings, the strings being of such length that the spout can be opened a predetermined angular position without actuating said latch means; and leaf springs mounted on the side walls adjacent said connecting means, said latch means consisting of said pins and said leaf springs; said first-mentioned spring means being coil springs connected between the top of said window and the tops of the grooves at the sides adjacent thereto.

References Cited in the file of this patent

UNITED STATES PATENTS

| | | |
|---|---|---|
| 618,160 | Barker | Jan. 24, 1899 |
| 843,895 | Koch | Feb. 12, 1907 |
| 1,101,337 | Schindler | June 23, 1914 |
| 2,799,431 | Bush et al. | July 16, 1957 |